United States Patent [19]
Randolph, Jr.

[11] 3,742,418
[45] June 26, 1973

[54] ELECTROMECHANICAL DEFLECTION SENSING DEVICE

[76] Inventor: George J. J. Randolph, Jr., 1505 177th Avenue N.E., Bellevue, Wash. 98008

[22] Filed: Aug. 3, 1970

[21] Appl. No.: 60,526

[52] U.S. Cl. .................................................. 338/5
[51] Int. Cl. ............................................. G01l 1/22
[58] Field of Search ................. 338/5, 6; 73/88.5, 73/141 A

[56] References Cited
UNITED STATES PATENTS

| | | | |
|---|---|---|---|
| 3,327,270 | 6/1967 | Garrison | 338/5 |
| 3,323,367 | 6/1967 | Searle | 338/5 |
| 3,245,018 | 4/1966 | Russell | 338/5 |
| 3,447,766 | 6/1969 | Palfreyman | 338/5 |
| 3,599,479 | 8/1971 | Kutsay | 73/88.5 |

Primary Examiner—R. Skudy
Attorney—Kolisch & Hartwell

[57] ABSTRACT

A sensing device including an elongated beam having an outer surface of revolution and including a generally conical medial portion whose sides taper toward a point disposed on the beam's longitudinal axis and located within an adjacent end portion in the beam. An elongated ceramic-encapsulated piezoresistive element is bonded through such encapsulating material to the outside of the beam's medial portion, and is disposed in a common plane with the beam's longitudinal axis.

4 Claims, 6 Drawing Figures

PATENTED JUN 26 1973　　　　　　　　　　　　　　　　3,742,418
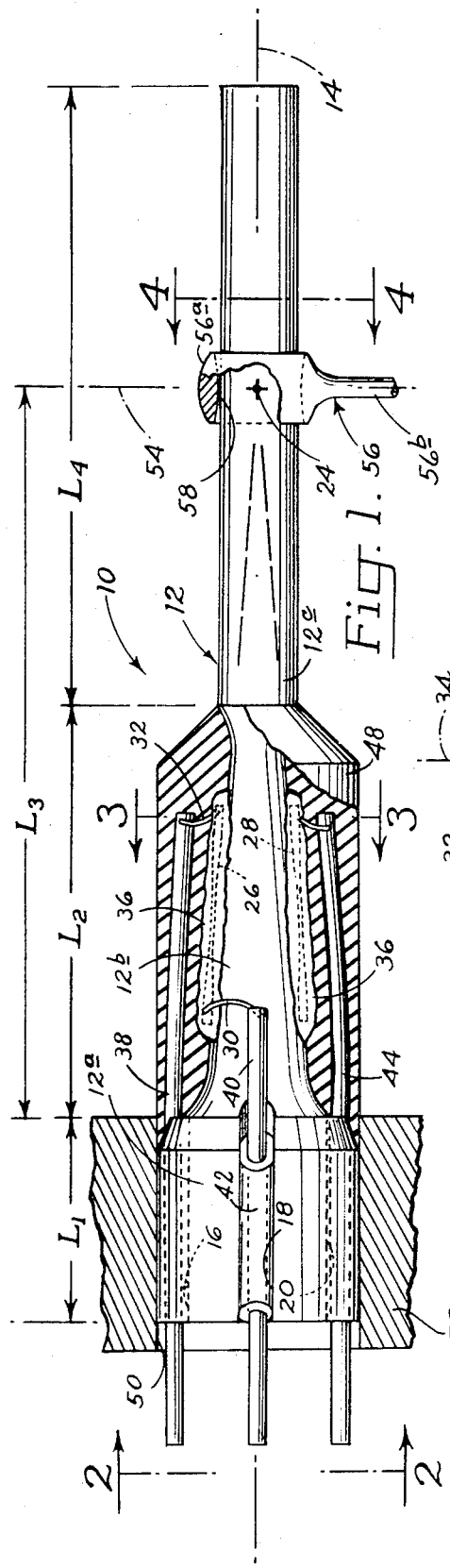
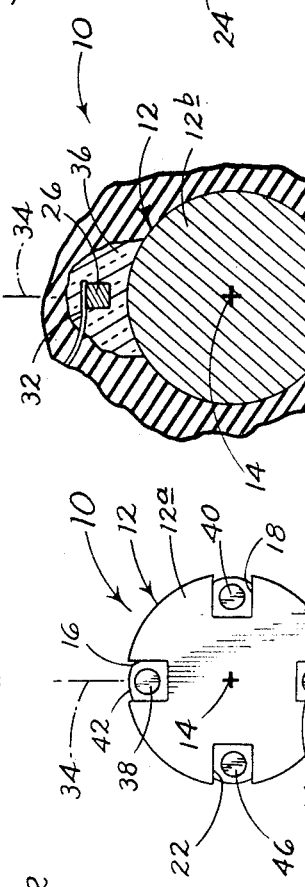
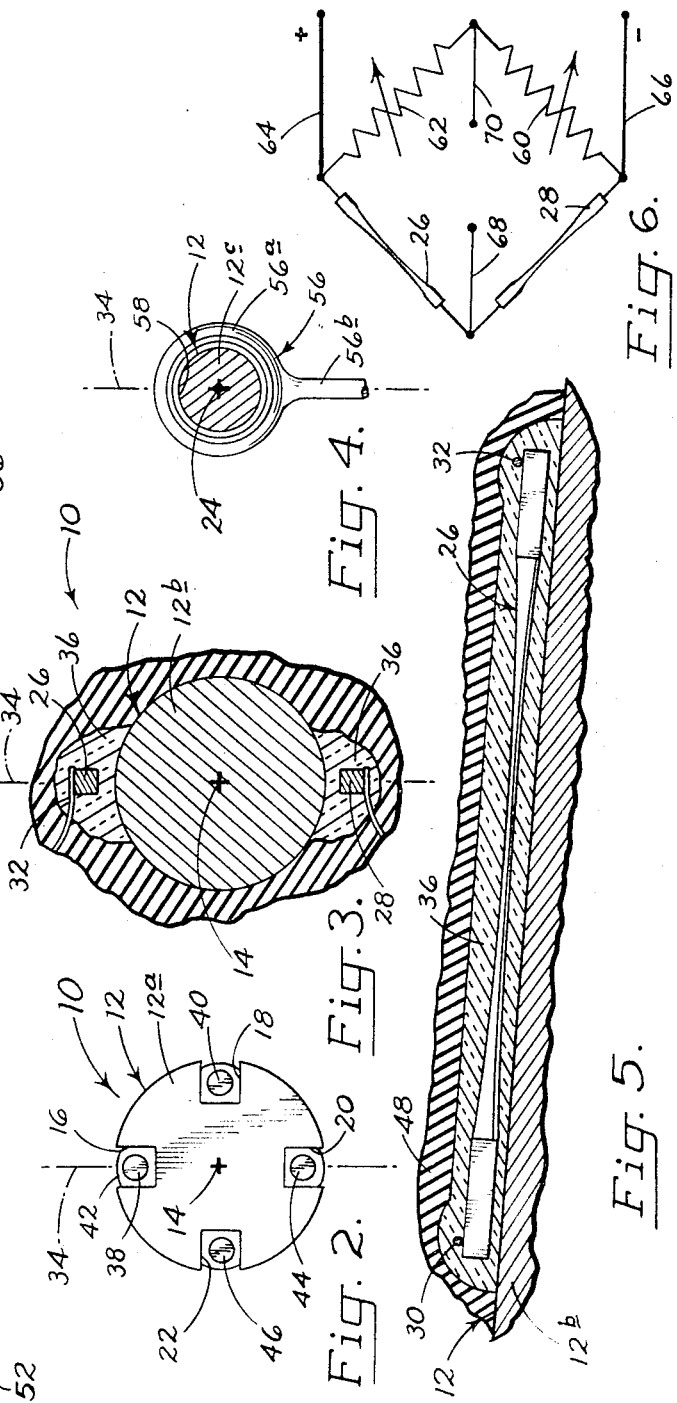
George J. J. Randolph, Jr.
INVENTOR
BY Kolisch & Hartwell
Attys.

ELECTROMECHANICAL DEFLECTION SENSING DEVICE

BACKGROUND OF THE INVENTION

This invention pertains to an electromechanical device for sensing deflections which occur at different locations in various kinds of equipment.

There are many circumstances where it is desirable to follow such deflections. For example, one might wish to monitor the deflections which take place (in a certain direction) in a part in the frame of a ship. Such information might be wanted to determine the levels of stresses that occur in the part; and/or it might be wanted to generate certain control signals.

In the past, various types of so-called strain gages have been provided for such purposes. The usual strain gage comprises an electrical resistance element whose resistance changes when the element is deformed. Typically, a user attaches such a gage as he wishes to a part wherein deflections are to be observed. Normally, the gage is glued in place at a selected location on the part, with the glue then acting as a load-transmitting medium between the part and the element in the gage.

Such arrangements, however, have not been entirely satisfactory. With attachment of the gage left to the individual user, very often nonuniform procedures are followed with successive attaching operations, and this results in nonuniform and nonreliable results. Particularly, this is true where different persons are involved in the different attaching operations. Further, a user in a particular instance may not properly locate, or orient, or secure a gage, and this will produce inaccuracies. Further, an attaching process of the type mentioned requires care and accuracy, and can be time-consuming and inconvenient.

A further important drawback is that the glues typically used often are not satisfactory load-transmitting media. Frequently, under circumstances of repeated use, they lack adequate strength to maintain a good bond, and when they break down significant errors are introduced. In addition, experience has shown that, over time, internal working in certain glues causes non-elastic internal changes which inhibit accuracy in the response of a gage. Further, many glues commonly used do not stand up well under harsh environmental conditions (temperature, chemical, etc.).

SUMMARY OF THE INVENTION

A general object of the present invention, therefore, is to provide a novel electromechanical sensing device which may be used to follow deflections for purposes such as those indicated above, and which avoids the problems encountered with presently available strain gages and the like.

More particularly, an object of the invention is to provide such a device which is accurate and reliable and simple to use.

A further object of the invention is to provide a sensing device of the type generally indicated which is capable of performing satisfactorily under a wide range of environmental conditions.

According to a preferred embodiment of the invention, the proposed sensing device comprises an elongated unitary beam having a mounting end portion, a load-receiving end portion and a tapered medial portion inbetween the two mentioned end portions. The medial portion and the load-receiving end portion have outer surfaces of revolution which are centered on the longitudinal axis of the beam; and the outer surface of a central part of the medial portion tapers uniformly toward a point on the beam's axis, which point is disposed within the beam's load-receiving end portion. Bonded through ceramic deposits to the surface of the tapered medial portion are one or more elongated slender piezoresistive bars. In the particular embodiment shown and described herein, two such bars are provided, on diametrically opposite sides of the medial portion, with their longitudinal axes occupying a common plane with the longitudinal axis of the beam.

According to the invention, the load-receiving end portion accommodates the transmission of a load at a right angle to the axis of the beam, with such load acting along a line which intersects the point (mentioned above) on the beam's longitudinal axis, and which is disposed in the common plane of the piezoresistive bars. Such a load may result from a deflection in a part whose performance is being observed. With a load applied along this line, the beam bends, and develops (in the surface regions of its medial portion which underlie the bars) uniform stresses which are transmitted through the ceramic bonding media to the bars. With bending of the beam, the bars deform and change their electrical resistance characteristics; and these changes may be followed in a conventional way to interpret the characteristics of the deflection in the part under observation.

With such construction, an extremely accurate and reliable device results. With the piezoresistive bars and beam joined through the ceramic medium, all that a user need do is suitably mount the beam, through its mounting end portion, adjacent the particular part wherein deflections are to be monitored. He may then, in any suitable manner, establish a connection between the proper point on the load-receiving end of the beam and the particular region of the part where it is desired to follow deflections. The tasks of properly orienting and cementing a strain gage in place are eliminated.

With the outside surfaces of the load-receiving end portion and the medial portion of the beam comprising surfaces of revolution centered on the beam's longitudinal axis, it is a relatively simple matter for a user to make a proper connection with the load-receiving end of the beam whereby a load is transmitted thereto at a right angle to the axis of the beam. With the medial portion of the beam tapering, to a point on such axis within the beam's load-receiving end, it is also a relatively simple matter for a user to assure that any load applied externally to the beam acts along a line intersecting this point. With such the case, uniform stresses result along the length of the tapered medial portion, and this is important in obtaining, among other things, maximum accuracy and reliably in the responses of the piezoresistive bars.

With ceramic material employed as a bonding and encapsulating medium for the piezoresistive bars, good load transmission occurs from the beam to a bar. In addition, such material provides good thermal and electrical isolation for a bar, and protects it against various harsh environmental conditions. Of the various ceramic materials which may be used, glass is preferred because of its exceptional elastic characteristics.

One particular important feature of the invention which especially accomodates the successful use of ceramic material (glass or other) in the manner indicated, is that the outside surface of the medial portion of the beam, whereon the encapsulating deposits are placed, has a surface-finish index no greater than 10 microinches (rms). As will be appreciated by those skilled in the art, the term "microinches (rms)" is a conventional one used as an index to describe the roughness of a surface. With the surface of the medial portion having such a finish index stress concentrations in a ceramic deposit are maintained relatively uniform, and the ceramic material can perform satisfactorily over a relatively wide range of loads applied to the load-receiving end of the beam. Experience has shown that a surface having a finish index above 10 microinches (rms) results in an overlying ceramic deposit developing regions of nonuniformly high stress concentration during bending of the beam. Such can result in shattering of the material in a deposit under operating conditions which are well within the operating capacity of the material with the underlying surface-finish index below 10 microinches (rms).

DESCRIPTION OF THE DRAWINGS

These and other objects and advantages attained by the invention will become more fully apparent as the description which follows is read in conjunction with the accompanying drawings, wherein:

FIG. 1 is a side view of a sensing device constructed according to the invention, with portions of the device broken away to illustrate details of construction;

FIG. 2 is a view taken along the line 2—2 in FIG. 1;

FIG. 3 is an enlarged fragmentary cross-sectional view taken along the line 3—3 in FIG. 1;

FIG. 4 is a cross-sectional view, on about the same scale as FIG. 1, taken along the line 4—4 in FIG. 1;

FIG. 5 is an enlarged fragmentary side elevation, on about the same scale as FIG. 3, illustrating the mounting provided for a piezoresistive bar in the device of FIG. 1; and FIG. 6 is a circuit diagram illustrating how the two piezoresistive bars provided in the device of FIG. 1 may be connected in a bridge to follow the operation of the device.

Turning now to the drawings, indicated generally at 10 is an electromechanical sensing device constructed according to the invention. Device 10 comprises an elongated unitary beam 12 having a mounting end portion 12a a medial portion 12b, and a load-receiving end portion 12c. An important feature herein is that the configuration of beam 12 results from a turning operation, as on a lathe, whereby the outer surfaces of its various portions, and particularly portions 12b, 12c, comprise surfaces of revolution centered about the beam's longitudinal axis, shown at 14.

Preferably, the beam is formed of a stainless steel, and several common types, indicated hereinafter, have been found to be satisfactory: No. 416; No. 440C; and No. 6 (type 430). These three steels have the following respective coefficients of linear expansion: $6.4 \times 10^{-6}$ inches/inch-°F; $5.6 \times 10^{-6}$ inches/inch-°F; and $6.3 \times 10^{-6}$ inches/inch-°F. These coefficients apply to the temperature range of about 32°F. to about 1,000°F. It will be explained later why it is important to consider the linear expansion coefficient of the material selected for the beam. In the particular embodiment shown herein, the beam is formed of No. 416 stainless steel.

While several particular steels are indicated herein as usable, it is appreciated that other steels may also be used. It should also be understood that materials other than steel may be used.

Further describing beam 12, portion 12a is generally cylindrical in configuration. It has an outside diameter of about 0.25 inches, and a length $L_1$ of about the same dimension. The right end of end portion 12a in FIG. 1 is chamfered. Four diametrically opposed elongated grooves 16, 18, 20, 22 are formed on the outside of portion 12a. These grooves are spaced substantially equally about the circumference of portion 12a, with their axes substantially paralleling axis 14.

As can be seen in FIG. 1, medial portion 12b includes an elongated uniformly tapered central part, or zone, opposite ends of which join through curved flared parts with portions 12a, 12c. The tapered central part of the medial portion tapers toward a point 24 disposed on axis 14 within load-receiving end portion 12c. According to the invention, the outside surface of this tapered part has a finish index no greater than 10 microinches (rms). In the particular embodiment illustrated, the finish index of this surface is about 4 microinches (rms). The overall length of portion 12b, indicated at $L_2$ in FIG. 1, is about 0.50 inches. The length of the tapered central part thereof is about 0.40 inches. The axial distance from the left end of portion 12b in FIG. 1 to point 24, such distance being indicated at $L_3$ in FIG. 1, is about 0.85 inches. The location of point 24 inside beam portion 12c may be marked or indicated in any suitable fashion on the outside surface of the portion; or it may be identified as being located a certain specific distance from some exposed point on the beam.

So long as the tapered region as contemplated herein tapers toward a point on the beam's longitudinal axis and disposed within end portion 12c, the particular configuration of the tapered region may be modified to suit different applications. It is important, however, that point 24 be located somewhere within a beam's load-receiving end portion, and on the beam's longitudinal axis.

Load-receiving end portion 12c is generally cylindrical in configuration, having an outside diameter of about 0.093 inches, and a length, indicated herein at $L_4$ in FIG. 1, of about 0.75 inches.

Mounted on diametrically opposite sides of the tapered part of medial portion 12b are two elongated piezoresistive bars, or strain gage means, 26, 28. These bars are substantially the same in construction, and in sensing device 10 are formed of a conventional P-type silicon. Preferably, these two bars have closely matched electrical resistance characteristics, whereby under similar operating conditions, their respective electrical resistances are substantially the same.

Referring particularly to FIGS. 3 and 5, the opposite end portions of each bar have substantially rectangular cross sections, and join with a reduced diameter medial portion. Such a reduced diameter portion results from a conventional etching process employed to establish a desired resistance in the bar. The two bars have substantially the same over-all lengths, which in the embodiment illustrated are about 0.30 inches. It will be noted that this dimension is less than the length of the tapered part of medial portion 12b. Such a dimensional relationship permits mounting of the bars without the same extending over a flared end part of the medial portion. Were a bar so to extend, inaccurate responses would result with the sensing device in operation. Suitably welded to the opposite end portions of each bar are two aluminum leads, such as leads 30, 32 welded to the end portions of bar 26.

According to the invention, bars 26, 28 are positioned with their longitudinal axes disposed in a substantially common plane with axis 14. This plane is illustrated at 34 in FIG. 3. Also according to the invention, the bars are bonded to the outside surface of the tapered part of medial portion 12b through encapsulating deposits 36 of a suitable electrically insulating load-transmitting ceramic material. Deposits 36 completely surround the bars and isolate them electrically from beam 12. To ensure maximum accuracy and reliability in the transmission of a load from the beam to a bar, the deposits are prepared in such a way that they contact medial portion 12b only on the outside surface of the tapered part thereof.

As contemplated herein, the material selected for the deposits has a coefficient of linear expansion which is equal to or less than that of the material forming beam 12, but no less than half that of the beam material. In most instances it is desirable that the coefficient of the deposit material is less than that of the beam material, and in the embodiment being described, this is the case. The deposits are prepared on the beam, and fused thereon with heat (applied both to the deposits and to the beam). On cooling of the assembly, the material in the deposits is placed under a certain amount of compression, by virtue of greater contraction occurring in the beam material. Such compression is desirable since it minimizes the chance that during operation of device 10 excessive tension will develop in the deposits. Many ceramic materials are quite susceptible to fracturing under tension, and it is thus desirable to have the material in the deposits perform (as much as possible) under compressive conditions. This is especially important where glass is employed. Satisfactory compressive conditions have been found to result with the magnitudes of the respective expansion coefficients related as indicated above.

While various ceramic materials may be used as a bonding media, those which form a type of glass are preferable since they typically exhibit superior elastic characteristics, and under most circumstances perform best in transmitting a load from the beam to an encapsulated bar. One particular material of this type which has been found to perform quite satisfactorily is a product made currently by Corning Glass Works, Corning, N.Y., and sold under the trade name Pyroceram cement No. 89. This material is fusible under heat into a hardened form, and when fused forms a unitary mass of glass having a coefficient of linear expansion of about $4 \times 10^{-6}$ inches/inch-°F. It will be noted that this expansion coefficient has the proper relationship to the coefficients of the three steels mentioned earlier.

Referring to FIG. 1, the outer ends of leads 30, 32 are suitably welded to the inner ends of elongated copper pins 38, 40, respectively. Pin 38 extends through groove 16, and beyond the left end of portion 12a of beam 12 in FIG. 1. Pin 38 is supported in groove 16, and spaced from the walls and base of the groove, by means of a mass of a suitable epoxy or ceramic cement indicated generally at 42 in FIG. 2. In a similar manner, pin 40, which is somewhat shorter than pin 38, extends through and is supported in groove 18. The outer ends of the aluminum leads attached to bar 28 are welded to copper pins 44, 46 which correspond to pins 38, 40, respectively. Pins 44, 46 extend through and are supported in grooves 20, 22.

Formed, as by molding, about medial portion 12b is a body of protective material 48 which encapsulates and encloses pins 38, 40, 44, 46, deposits 36, and the aluminum leads extending from the deposits to the pins. Material 48 preferably comprises a conventional pliable room-temperature-vulcanizing silicon rubber. This material, in addition to providing protection to the parts encased therein, inhibits undesirable vibrations in the aluminum leads where they protrude from deposits 36, and in the inner ends of the copper pins.

In FIG. 1, sensing device 10 is shown mounted for operation. Mounting end portion 12a is received snugly and firmly in a bore 50 provided in a member 52. Member 52 may comprise either a part of the machine or article wherein vibrations are to be followed, or it may comprise a suitable mounting bracket prepared for the sensing device and suitably positioned adjacent the machine or article. With beam 12 so mounted, it performs as a cantilever. The chamfer provided on the right end of portion 12a, and that on the right end of encapsulating body 48, facilitate insertion of the device in bore 50.

An important feature of the invention is that beam end portion 12c accommodates the transmission to the beam of a load acting along a line, such as line 54 in FIG. 1, disposed in plane 34 and intersecting point 24 at substantially a right angle to axis 14. Such action assures the development of uniform stresses along the tapered part of medial portion 12b—such uniformity playing an important role in the accuracy of device 10. With the outside surface of end portion 12c comprising a surface of revolution centered about axis 14, and with the location of point 24 inside the end portion designated, it is a relatively simple matter for a user to assure that a load is so transmitted to the beam. Any load which acts normal to the outside surface of end portion 12c automatically acts normal to axis 14.

In the setup illustrated herein, a load is transmitted to beam 12 through a member 56 having a head 56a joined to one end of an elongated stem 56b. The head is provided with a bore 58 (flared at its opposite ends), which snugly receives end portion 12c. In particular, a central part of the curved wall of bore 58 seats against the outside surface of end portion 12c in a plane containing point 24 and disposed normal to axis 14. Stem 56b is disposed with its longitudinal axis coinciding with line 54. The other end (not shown) of stem 56b is attached in any suitable fashion to the particular point on the machine or article wherein deflections are to be observed. Such deflections cause member 56 to reciprocate axially along line 54, and bend beam 12 back and forth in plane 34.

While a particular member has been illustrated herein for transmitting a load to portion 12c of the beam, it will be appreciated that there are numerous other types of connections which may be provided to suit different circumstances.

FIG. 6 in the drawings is a circuit diagram of a bridge which may be used in conjunction with bars 26, 28 (with electrical connections to such being through the copper pin and the aluminum leads) to follow the operation of device 10. As will be appreciated by those skilled in the art, the bridge in this diagram is conventional in its construction and operation. Disposed in the leg of the bridge which is opposite bar 26 is a variable balancing resistor 60, and disposed in the leg of the bridge opposite bar 28 is a similar resistor 62. Input terminals 64, 66 of the bridge are connected to the plus and minus terminals, respectively, of a suitable source of DC power. Output terminals 68, 70 of the bridge may be connected in a conventional way to anyone of a number of different types of indicating circuits or devices.

Typically, the bridge is balanced under conditions with no load transmitted through member 56 to beam 12. In its balanced condition, no potential difference exists between the two output terminals. On a load being applied to the beam which bends it in one direction in plane 34, the resistances of bars 26, 28 change due to deformations therein with bending of medial portion 12b. It will be apparent that the resistance of one bar increases and that of the other decreases. On such occurring, a potential difference of a certain polarity develops between output terminals 68, 70. And the magnitude of this potential difference may be interpreted to indicate characteristics of the causal deflection in the part being observed. With a load applied which bends the beam in the opposite direction, the reverse action takes place.

Changes in ambient temperature do not affect the accuracy of the device by unevenly stressing the bars with the same mounted as shown.

With the particular sensing device described herein, the device can respond accurately to a load causing a deflection in end portion 12c of the beam of up to about 0.025 inches along line 54 in either direction. Experience has shown that repeated operation of the device, even under conditions of maximum deflection in the beam, causes no appreciable breakdown or deterioration in the deposits encapsulating bars 26, 28. As a consequence, long accurate performance of the device is attainable. Deposits 36 faithfully transmit bending forces to bars 26, 28, without showing signs of nonelasticity, and thus good reliability is obtained. With bars 26, 28 sealed in deposits 36, and these deposits, the aluminum leads, and the inner ends of the copper pins sealed inside encapsulating body 48, device 10 is capable of performing satisfactorily even under various harsh environmental conditions.

The proposed device also offers substantial advantages in that is avoids the problems encountered heretofore in the mounting and orienting of strain gages. In the present device, the strain gages (bars 26, 28) are already properly mounted and oriented—i.e., on beam 12. This feature greatly enhances the versatility of the device. The outside surface of the load-receiving end portion of the beam is configured to assured convenient and simple user-application of a load properly to the end portion.

While a sensing device has been described herein having a pair of piezoresistive bars mounted on it, it is appreciated that a greater or lesser number of bars, or the like, may be provided to take care of different particular applications. Thus, while a preferred embodiment of the invention has been described herein, it is appreciated that variations and modifications may be made without departing from the spirit of the invention.

It is claimed and desired to secure by Letters Patent:

1. An electromechanical sensing device comprising
   an elongated unitary beam including a mounting end portion, a medial portion, and a load-receiving end portion,
   said medial portion and said load-receiving end portion each having an outer surface of revolution centered about the longitudinal axis of the beam, and said medial portion including a uniformly tapered region which tapers toward a point disposed on said axis and within said load-receiving end portion,
   said load-receiving end portion accommodating transmission of a load to said beam along a line intersecting said point and disposed at substantially a right angle to said axis,
   elongated electrical strain gage means having a length no greater than that of said tapered region, and
   an electrically insulating load-transmitting ceramic bonding medium securing said strain gage means to the outside surface of said tapered region with the opposite ends of the strain gage means spaced inwardly from the opposite ends of said region, and with the strain gage means disposed substantially in a plane containing said axis and said line,
   said beam being made of metal having a coefficient of expansion which is equal to or greater than, but no more than twice, that of said ceramic medium.

2. The sensing device of claim 1, wherein said strain gage means comprises a bar of piezoresistive material.

3. The sensing device of claim 1, wherein said ceramic medium comprises glass.

4. The sensing device of claim 1, wherein said tapered region includes a zone on its outer surface having a surface finish with an index no greater than ten microinches (rms), said electrical strain gage means is sized to fit within the boundaries of said zone, and said ceramic bonding medium completely surrounds said strain gage means.

* * * * *